UNITED STATES PATENT OFFICE.

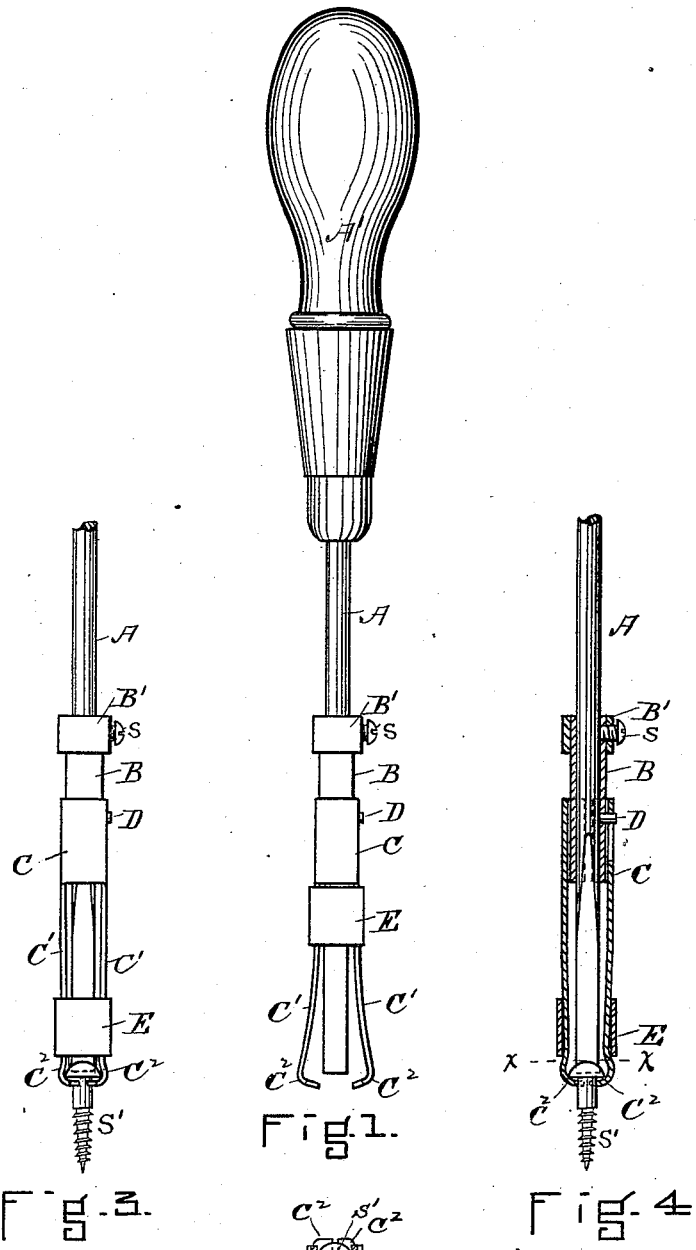

LEWIS H. BOYDEN, OF BOSTON, MASSACHUSETTS, ASSIGNOR TO HERBERT M. ROWELL, OF SAME PLACE.

ATTACHMENT FOR SCREW-DRIVERS.

SPECIFICATION forming part of Letters Patent No. 470,778, dated March 15, 1892.

Application filed June 1, 1891. Serial No. 394,788. (No model.)

*To all whom it may concern:*

Be it known that I, LEWIS H. BOYDEN, of Boston, in the county of Suffolk and State of Massachusetts, have invented certain new and useful Improvements in Attachments for Screw-Drivers, of which the following, taken in connection with the accompanying drawings, is a specification.

The object of my invention is to so make a simple device for holding screws to the bit of the driver that it may be readily attached to the shank of any screw-driver, and when so attached to form a device which will securely hold the screw to the bit of the screw-driver in line with the same and in proper position to be applied to the article in which it is to be used. This object I attain by the mechanism shown in the accompanying drawings, in which—

Figure 1 is an elevation of a screw-driver with my improved attachment. Fig. 2 is a cross-section taken on line $x\text{-}x$ of Fig. 4. Fig. 3 is an elevation of the attachment and a part of the shank of the screw-driver, the line of view being at right angles to the line on which Fig. 1 is taken. Fig. 4 is a vertical section showing the same parts that are shown in Fig. 3.

In the drawings, A A' represents an ordinary screw-driver.

B is a quill made of the required size to slip easily onto the shank of the screw-driver for which it is designed.

B' is an enlarged part of the quill B and is adapted to take a set-screw S, which serves to fasten the attachment to the screw-driver shank. This quill B B' is represented in the drawings as being square, although it may be made round, if desirable.

C is a second quill adapted to fit onto the outside of the quill B and freely slide on it.

D is a pin inserted in the quill B and adapted to pass through a slot made in the quill C and to form a guide for the part C, as well as a check to prevent the same from being slipped entirely off from the part B.

The quill C has two arms C' C', extending downward. These arms are curved, as shown in Fig. 1 and terminate in hooked ends $C^2$ $C^2$. These hooked ends serve, when the two arms are brought together by the act of drawing the sliding ferrule E downward, as shown in Fig. 4, to grip and hold the screw S', as shown in Figs. 3 and 4.

I claim—

In combination with the shank of a screw-driver of ordinary construction, the holding-quill B, having a set-screw S, adapted to clamp and securely hold the said quill to the shank, also having a pin D, the sliding quill C, slotted to receive the pin D, having arms C' C', and the sliding ferrule E, all adapted to operate together, substantially as described, and for the purpose set forth.

In testimony whereof I have signed my name to this specification, in the presence of two subscribing witnesses, on this 21st day of May, A. D. 1891.

LEWIS H. BOYDEN.

Witnesses:
   FRANK G. PARKER,
   EDWARD S. DAY.